(12) United States Patent
Chapman

(10) Patent No.: US 10,399,516 B2
(45) Date of Patent: Sep. 3, 2019

(54) CABLE SUPPORT

(71) Applicant: HellermannTyton Limited, Manchester (GB)

(72) Inventor: Philip Chapman, Manchester (GB)

(73) Assignee: HellermannTyton Limited (GB)

( * ) Notice: Subject to any disclaimer, the term of this patent is extended or adjusted under 35 U.S.C. 154(b) by 25 days.

(21) Appl. No.: 15/797,097

(22) Filed: Oct. 30, 2017

(65) Prior Publication Data
US 2018/0050646 A1 Feb. 22, 2018

Related U.S. Application Data

(63) Continuation-in-part of application No. PCT/GB2016/051220, filed on Apr. 28, 2016.

(51) Int. Cl.
B60R 16/02 (2006.01)
H02G 3/32 (2006.01)
F16L 3/18 (2006.01)

(52) U.S. Cl.
CPC ............ B60R 16/0215 (2013.01); F16L 3/18 (2013.01); H02G 3/32 (2013.01)

(58) Field of Classification Search
CPC ... H02G 3/32; B60R 16/0215; F16B 37/0842; F16L 3/123
USPC .......................................................... 248/73
See application file for complete search history.

(56) References Cited

U.S. PATENT DOCUMENTS

| 1,037,010 | A | | 8/1912 | Irons et al. | |
| 3,633,250 | A | | 1/1972 | Romney et al. | |
| 4,990,044 | A | * | 2/1991 | Kimak | F16B 37/0842 411/301 |
| 5,390,882 | A | * | 2/1995 | Lee | B60R 11/00 24/16 R |
| 5,760,338 | A | * | 6/1998 | Suzuki | B60R 16/0215 174/135 |
| 6,076,781 | A | * | 6/2000 | Kraus | F16L 3/24 248/231.91 |
| 7,128,514 | B1 | * | 10/2006 | Le Beau | F16B 37/0892 411/433 |
| 7,938,451 | B2 | | 5/2011 | Taillon | |
| 10,148,075 | B2 | * | 12/2018 | Loewe | H02G 3/32 |
| 10,196,013 | B2 | * | 2/2019 | Pantino | B60R 16/0215 |
| 2009/0058105 | A1 | | 3/2009 | Littrell et al. | |
| 2009/0320541 | A1 | | 12/2009 | Stone | |
| 2010/0127135 | A1 | | 5/2010 | Stocker | |

(Continued)

FOREIGN PATENT DOCUMENTS

CN 101479517 A 7/2009
FR 2796426 A1 1/2001

*Primary Examiner* — Bradley Duckworth
(74) *Attorney, Agent, or Firm* — Robert J. Myers

(57) ABSTRACT

A cable support is provided that includes an elongate support member for supporting a cable or cables secured thereto. A mounting member is connected to the support member and secures the support member to a mounting stud on a trim panel or other support substrate. The mounting member comprises a bore for receiving the mounting stud. A locking member is provided that has an aperture formed therein for receiving the mounting stud. The locking member is connected to the mounting member in axial alignment with the bore and rotatably connected to the mounting member such that the mounting member and support member are rotatable relative to the locking member.

34 Claims, 20 Drawing Sheets

(56) References Cited

U.S. PATENT DOCUMENTS

2012/0248275 A1 10/2012 Soh et al.
2013/0160246 A1 6/2013 Hajduch

* cited by examiner

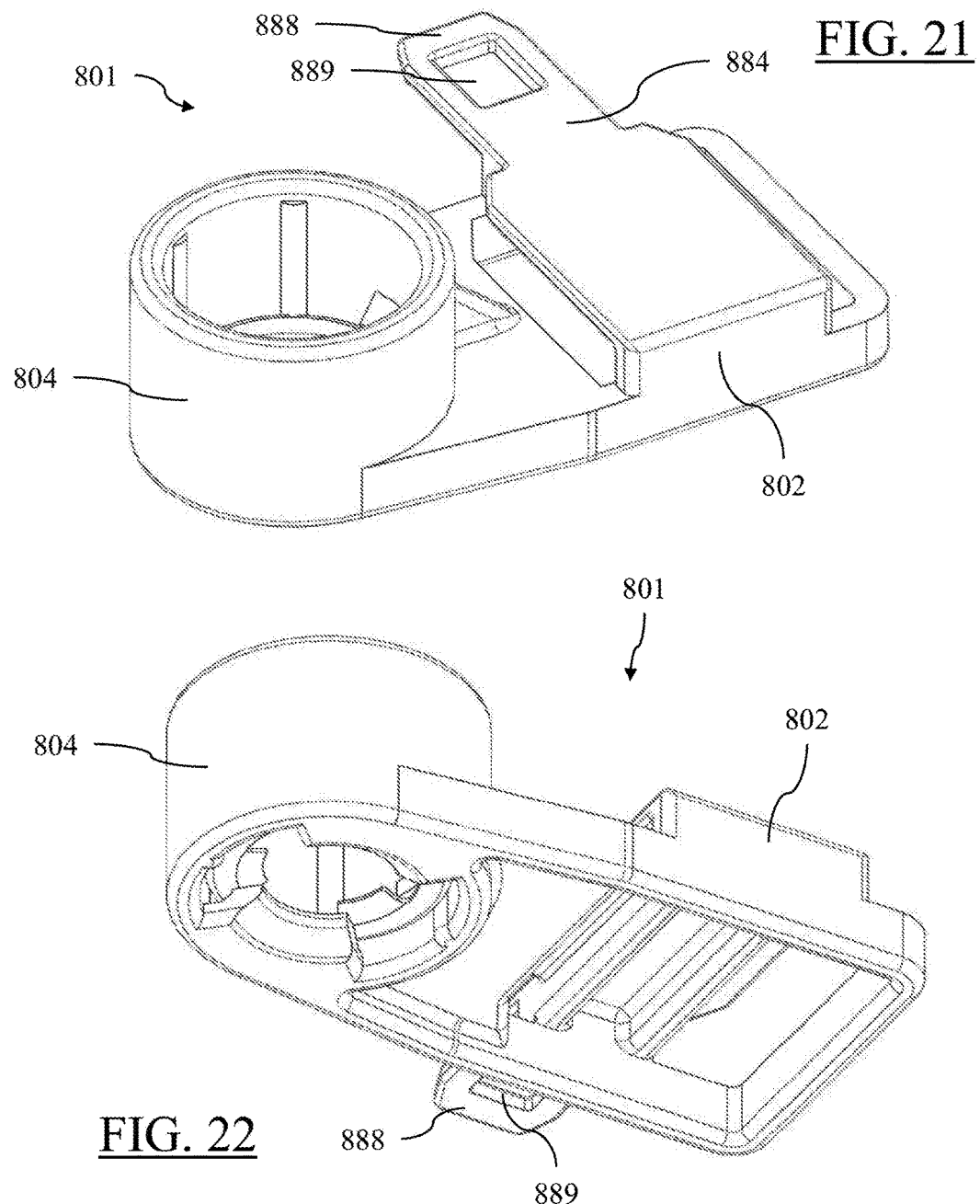

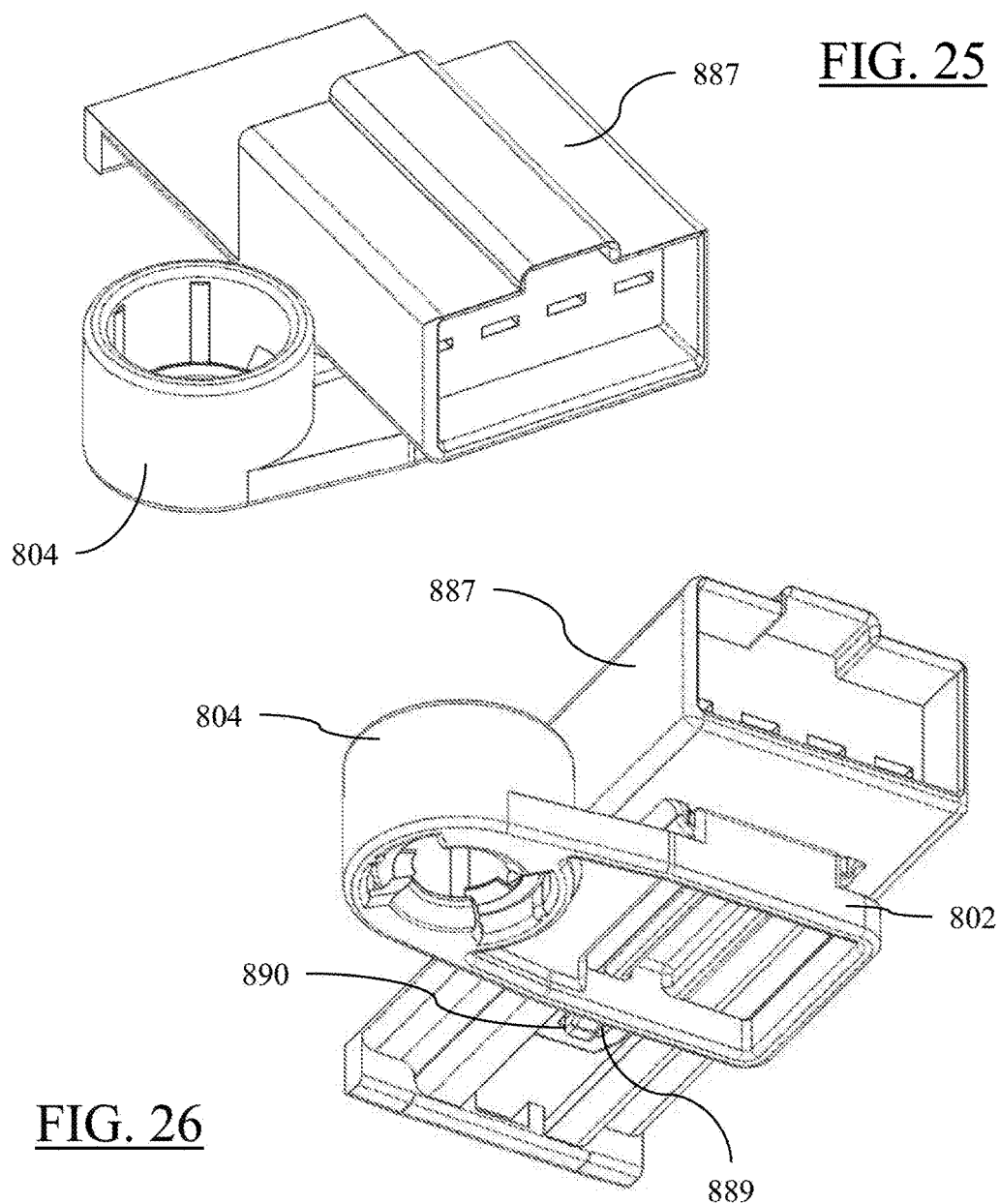

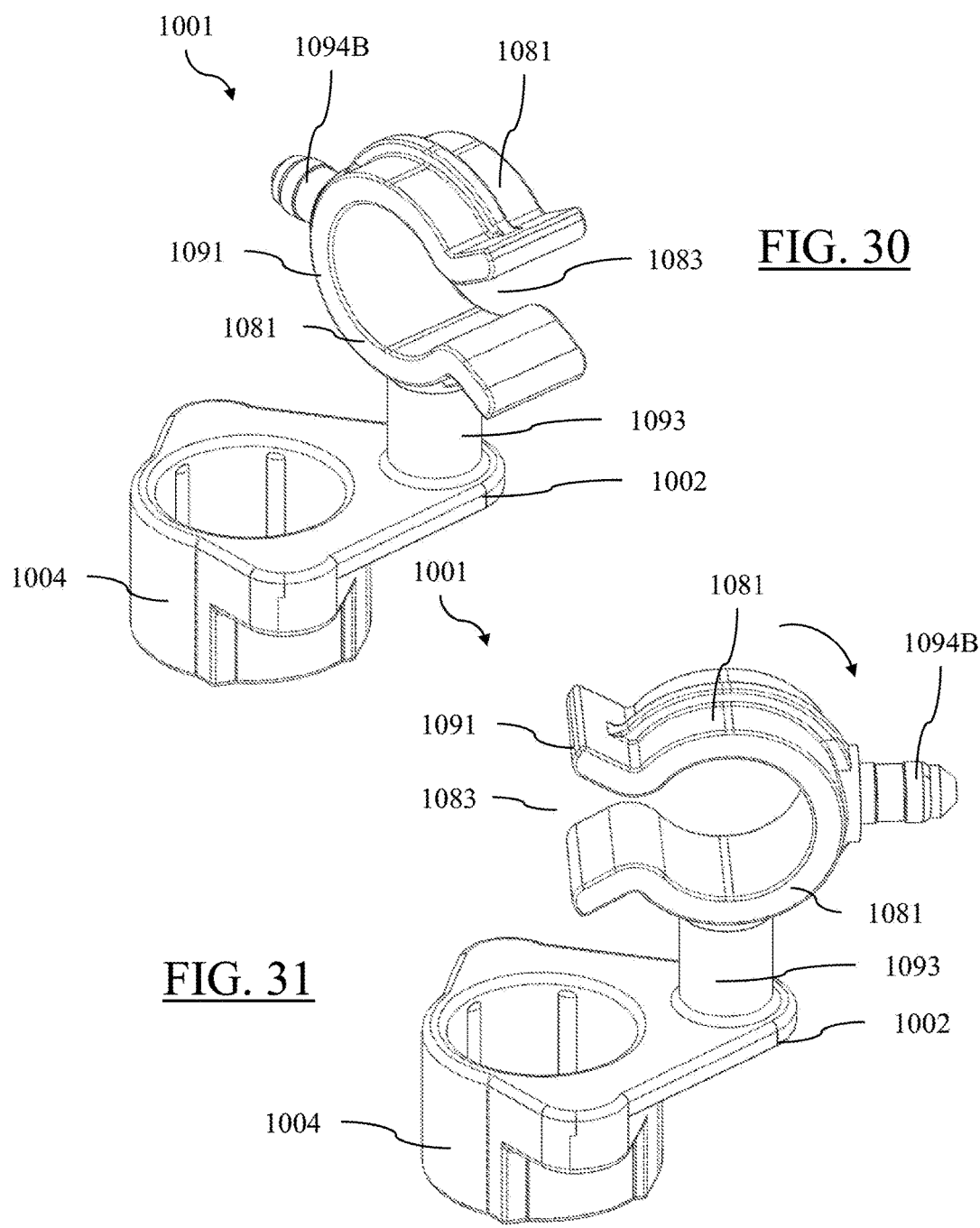

CABLE SUPPORT

CROSS REFERENCE TO A APPLICATIONS

This application is a bypass continuation-in-part application and claims benefit under 35 U.S.C. § 365(c) of International Patent Application PCT/GB2016/051220 filed Apr. 28, 2016 which claims the benefit of Great Britain Patent Application Serial No. 1507400.8, filed Apr. 30, 2015, the entire disclosure of each of which are hereby incorporated by reference.

TECHNICAL FIELD OF INVENTION

The present invention relates to a cable support, and in particular to a bracket for securing electrical cables within a vehicle.

BACKGROUND OF THE INVENTION

Body panels such as doors for passenger vehicles typically comprise a main body forming the structure of the door or other panel, and an interior trim panel assembly. The trim panel assembly provides an aesthetically pleasing appearance to the interior surface of the door that also enables the mechanical and electrical elements of the door to be concealed from view. It is known to use trim panels for obscuring and protecting electrical wiring. Wiring is supported and channeled behind the trim panel. It is important that the wiring is held securely in place within the void behind the trim panel to avoid rattle and to protect the wiring and associated connections from damage. The inner surface of a door panel, as with other body panels, is typically devoid of connection features such as eyes for cable ties that could be used to secure the wiring in position.

A trim panel includes an inner surface facing into the void towards the main body panel, and an outer surface facing outwardly into the vehicle. A known solution is to secure the wiring to the inner surface of the trim panel. Small eyelets and holes required for fasteners such as cable ties present difficulties in molding. Therefore, a common solution is to mold a stud projecting from the inner surface of the trim panel, and to secure to the mounting stud a substantially flat, elongate support bar to which the wiring may be secured via adhesive tape or other means.

FIG. 1 shows a molded plastic cable support of the prior art. The cable support 1 includes an elongate bar 2 and a clip portion 4. The clip portion 4 extends from an edge of the support bar 2 in a substantially perpendicular direction, with the bar 2 and clip section 4 defining a substantially T-shaped arrangement. The wiring is aligned along the length of the bar 2 and taped to the bar to hold it in position. The clip section 4 includes a cylindrical mount 6 having an inner bore that is arranged to receive a corresponding cylindrical molded stud of the trim panel. A substantially square shaped chamber 8 is located at one end of the mount 6 through which the bore continues. A slot 10 is formed in the lower edge of the chamber 8 into which a metal insert 12 is received. The insert 12 has a square shape corresponding to the shape of the inner volume of the chamber to prevent movement of the insert 12 within the chamber 8. The insert includes a central aperture 14 that aligns with the bore. The diameter of the aperture 14 is selected provide an interference fit over the mounting stud of the trim panel. As the cable support 1 is pushed onto the mounting stud, the edge of the aperture 14 of the metal insert bites into a plastic mounting stud causing linear scoring of the mounting stud as the locking member is moved axially into position. More problematically, any rotational forces applied to the support bar cause the bar and the locking member to rotate relative to the mounting stud. During rotation the locking member rotationally scores the mounting stud, leading to loosening of the locking member and potential failure of the mounting stud.

It is therefore desirable to provide an improved cable support which addresses the above described problems and/or which offers improvements generally.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In an embodiment of the invention there is provided a cable support comprising a support member for supporting a cable or cables secured thereto. A mounting member is provided for securing the cable support to a corresponding plastic mounting stud, the mounting member comprising a bore for receiving the mounting stud. A locking member is provided having an aperture formed therein for receiving the mounting stud, the locking member being connected to the mounting member in axial alignment with the bore. The locking member is rotatably connected to the mounting member such that the mounting member and support member are rotatable relative to the locking member. In this way any rotational forces applied to the support member and/or the main body cause the support member and/or the main body to rotate relative to the locking member, while the locking member remains rotationally fixed relative to the mounting stud. Preventing the support member and/or the main body from imparting a rotational force to the locking member ensures that the locking member does not rotationally score the mounting stud, thereby preventing the locking member from loosening over time and/or causing failure of the mounting stud.

Preferably the support member is an elongate blade that provides a support surface of substantial length to which the cables may be secured by adhesive tape or otherwise.

The cable support has a support surface to which the cable or cables are secured, and the cable support surface preferably has a concave profile in a direction transverse to the length of the blade. The concave profile corresponds to the curved surface of the cables, and increases the surface contact between the blade and the cables.

The locking member is preferably annular having an inner diameter configured to provide an interference fit with the mounting stud when inserted thereon. The annular shape provides a circular outer peripheral edge that is able to rotate within the corresponding circular cross section of the bore allowing relative rotation between the locking member and the main body, while the circular inner peripheral edge corresponds to the circular cross section of the mounting stud.

The locking member comprises a plurality of radially extending elongate slots extending radially outwards from the radially inner edge defining a plurality of annularly arranged teeth.

The bore of the main body includes an innermost opening and an outermost opening with an insertion direction being defined in a direction extending from the outermost opening towards the innermost opening which, when in use, is the direction in which the mounting member is inserted onto the mounting stud, wherein at least the radially innermost portion of the teeth are angled in the axial direction with the locking member being mounted to the mounting member such that the teeth are angled in the opposite axial direction to the insertion direction to inhibit axial removal of the locking member from the mounting stud.

The annular locking member is preferably formed of metal, which allows the locking member to lock into the surface of the softer plastic mounting stud.

The locking member is preferably mounted within the bore of the mounting member. The locking member may inserted into the mounting member in the insertion direction with the mounting member including one or more stop members to limit axial insertion of the locking member located at the inner end of the bore. One or more retaining members are also provided to prevent removal of the locking member in the opposite direction once inserted, with the locking member being retained between the retaining member and the stop member or members.

The one or more retaining members is preferably a retaining clip arranged to flex in the axial direction from a retaining position to an insertion position, the clip being arranged to flex to the insertion position on insertion of the locking member, and to return to the retaining position following insertion of the locking member. The retaining clips preferably have a tapered leading outer edge.

The axial spacing between the stop member and retaining member is preferably substantially equal to the thickness of the locking member to limit axial movement of the locking member within the bore. The locking ring preferably includes a wall at its peripheral edge extending axially away from the planar surface of the ring, the thickness of the locking member being defined by the height of the wall.

The at least one stop member preferably includes an curved inner surface having a radius corresponding to the inner radius of the locking member such that the inner edge of the locking member at the stop member are radially aligned.

The mounting member may include one or more radially extending engagement tabs arranged having an engagement surface which, when in use, faces away from the insertion direction, the one or more tabs arranged to allow pressure to be applied thereto by the user in the insertion direction to force the cable support onto the mounting stud.

The engagement tabs are preferably arranged on diametrically opposed sides of the mounting member, and preferably extend radially outwards in a direction parallel with the longitudinal axis of the support bar.

The mounting member includes a lower surface and an upper surface which surround the bore. The height of the mounting member and the mounting stud are selected such that when the mounting member is secured to the mounting stud the mounting stud does not project past the upper surface of the mounting member.

The engagement tabs are arranged to project laterally from the upper end of the mounting member.

Preferably the upper surface of the mounting member is spaced vertically above the upper surface of the cable support member. The mounting member preferably includes a body section having a cylindrical collar section extending upwardly above the height of the support member with the engagement tabs extending laterally from the upper end of the collar section.

The height of the mounting member is selected to be greater than the effective height of the mounting stud, the effective height being the height to which the mounting stud projects from the support substrate to which it is mounted.

Further features and advantages will appear more clearly on a reading of the following detailed description of the preferred embodiment, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which:

FIG. 21 is a perspective top view of a cable support according to a ninth embodiment of the invention;

FIG. 22 is a perspective bottom view of the arrangement of FIG. 21;

FIG. 25 is a perspective top assembled view of the arrangement of FIG. 21 including the connector;

FIG. 26 is a perspective bottom assembled view of the arrangement of FIG. 21 including the connector;

FIG. 30 is a perspective top assembled view of the arrangement of FIG. 29;

FIG. 31 is a another perspective top assembled view of the arrangement of FIG. 29 with the clip in an alternative orientation;

DETAILED DESCRIPTION OF THE INVENTION

Figure 1:
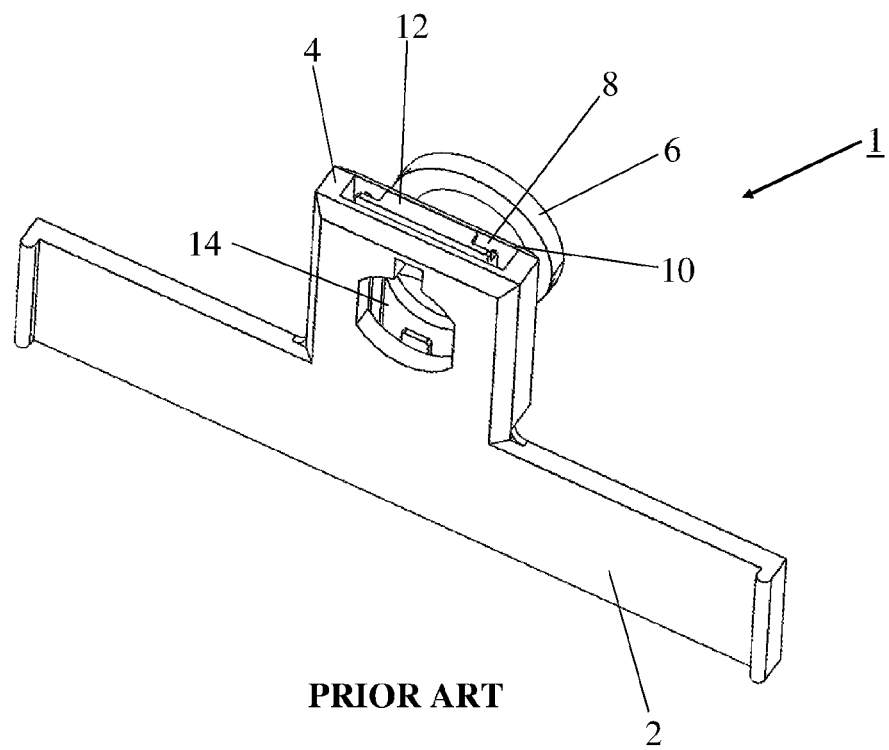
FIG. 1 shows a cable support of the prior art.
Figure 1A:
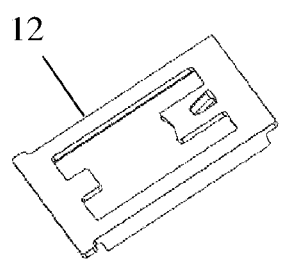
FIG. 1a shows the metal insert of the cable support of FIG. 1.
Figure 2:
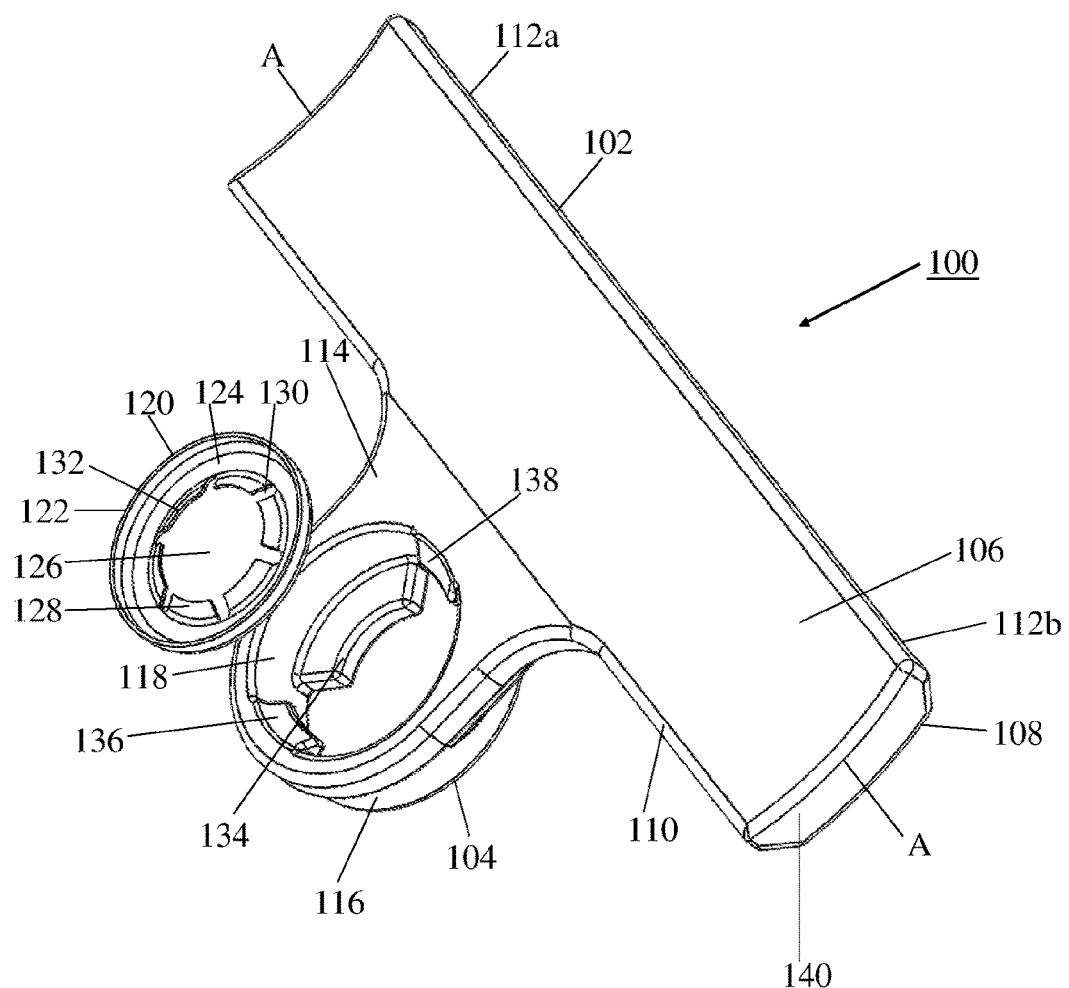
FIG. 2 shows an exploded view of a cable support according to a first embodiment of the invention.

A first embodiment of an electrical cable support 100 is illustrated in FIG. 2. The electrical cable support 100 includes an elongate rectangular bar section defining a support member 102, and a mounting member 104, for mounting the wiring support to a corresponding plastic mounting stud. The mounting stud may be integrally molded with, or separately mounted to, a support substrate. The support member 102 has an elongate rectangular form with a longitudinal axis A-A. The support member 102 includes a mounting surface 106 which, when in use, faces away from the trim panel and away from the insertion direction, and a corresponding inner surface 108. When in use, the wiring is secured to the mounting surface 106. The mounting surface 106 has a concave scalloped profile in the direction transverse to the longitudinal axis that is configured to accommodate the curved profile of a wiring bundle. The mounting member 104 extends from the lower edge 110 of the support member 102 and is centrally located along the length of the support member 102. End portions 112 of the support member 102 extend longitudinally outwards of the mounting member 104 in opposing directions.

The mounting member 104 includes a front flange section 114 that secures at its upper edge to the lower edge 110 of the support member 102. A cylindrical main body section 116 extends from the rear surface of the flange section 114. A bore 118 extends through the flange section 114 and the main body section 116. The bore 118 is open at both ends. The diameter of the bore 118 is sized to receive a metal locking disc 120 in a close fit in which there is little or no lateral movement between the bore 118 and the peripheral edge of the locking disc 120, while the locking disc 120 is able to rotationally move relative to the bore 118.

The locking disc 120 includes a peripheral reinforcing wall 122 and an annular planar surface 124 extending radially inwards from the reinforcing wall 122. An aperture 126 is defined by the inner edge of the annular planar surface 124. The plurality of teeth 128 extend radially inwards from the inner edge of the annular planar surface 124 into the aperture 126. A series of circumferentially arranged slits 130 are interspaces with the teeth 128. The locking disc 120 defines a radial axis and a rotational axis which, when in use, is coaxial with the longitudinal axis of the mounting stud, and which extends through the center of the aperture 126 perpendicular to the radial axis. The radial axis of the locking disc 120 defines the insertion axis, which, when in use, is the axis along which the locking ring 120 and bore are inserted over the mounting stud.

The teeth 128 are angled in the axial direction such that they slope away from the annular planar surface 124. The teeth 128 are angled rearwardly relative to the insertion direction of the locking ring 120. The radial inner edges 132 of the teeth 128 define an inner diameter to the locking disc 120 which is configured to have an interference fit with the mounting stud. As the locking disc 120 is inserted onto the mounting stud in the insertion direction, the teeth 128 are able to flex away from the surface of the mounting stud due to their rearwardly angled configuration to prevent or mitigate linear scoring along the length of the mounting stud, with the teeth having a return bias that urges them against the mounting stud. Once inserted to the required longitudinal position any attempt to withdraw the locking ring 120 in the opposing direction causes the inner edges 132 of the teeth 128 to dig into the surface of the mounting stud to axially lock the ring in position. The interspaced arrangement of the teeth 128 also allows the teeth 128 to key into the surface of the mounting stud which prevents rotation of the locking disc 120 relative to the mounting stud.

Figure 3:
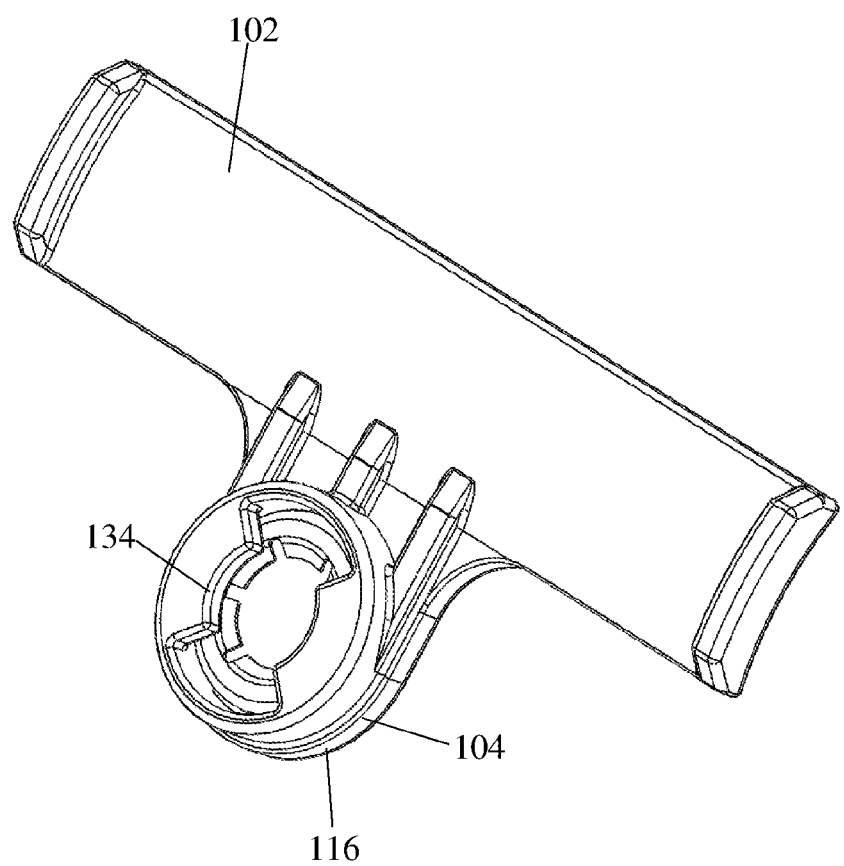
FIG. 3 is a reverse view of the arrangement of FIG. 2.

Rear stop members 134 are located at the axially rear end of the bore 118 at the insertion end. The stop members 134 extend radially into the bore axially locate the locking ring 120 within the mounting member 104 and stop the locking ring 120 from passing through the bore 118. As shown in FIG. 3, the stop members 134 are diametrically opposed and each extend in a circumferential direction around approximately one quarter of the bore edge. This arrangement advantageously reduces material. The curved radially inner edges of the stop members 134 have a radius substantially equal to the radius of the inner edge of the teeth 128 to provide a two-point contact along the length of the mounting stud. Retaining clips 136 are located at the opposing end of the bore 118. The retaining clips 136 include a tapered leading edge 138 which is engaged by the locking ring 120 as the locking ring 120 is inserted axially into the main body section 116. The retaining clips 136 are flexible and able to axially flex as the locking ring 120 is inserted. Once inserted the retaining clips 136 return to their original position and the upper edge of the reinforcing wall 122 engages against the axially innermost edge of the retaining clips 136 to prevent retraction of the locking disc 120.

The axial spacing between the axially outer facing surface of the stop number 134 and the axially inner facing surface of the retaining clips 136 is selected such that are substantially equal to the height of the reinforcing wall 122 of the retaining clip 136 such that the locking disc 120 is axially retained with limited movement between the retaining clips 136 and the stop members 134.

The locking disc 120 is held between the retaining clips 136 and the stop members 134 within the bore 118 with the axial and radial fit being selected as such that the locking disc 120 is able to rotate within the bore 118. As such, the main body section 116 and support member 102 to which it is attached are able to rotate relative to the locking disc 120 while the locking disc 120 remains rotationally fixed relative to the mounting stud. In use the locking disc 120 is inserted into the bore 118 and retained therein. The cable support 100 is then inserted over the mounting stud with the mounting stud being inserted into the bore 118 and through the locking disc 120 retained therein. The cable support 100 is urged along the mounting stud to the desired axial location with the locking disc 120 then locking the cable support 100 in this axial position. In this location the rearward surface of the main body of the cable support 100 abuts the trim panel from which the mounting stud extends.

The rear surface of the main body section 116 extends rearwardly of the rear surface of the main part of the support member 102. Therefore when the rear surface of the main body section 116 abuts the trim panel the rear surface of the support member 102 is spaced from the trim panel. To avoid stress on the join between the flange section 114 and the support member 102 if the support member 102 would be forced rearwardly the support member 102 is provided with a abutment members 140 that extend rearwardly from the support member 102 to provide abutment surfaces that engage the panel and limit any bending movement of the support member 102 rearwardly. As the cable support 100 is inserted onto the mounting stud the support member 102 and mounting member 104 are able to rotate relative to the mounting stud by virtue of rotation relative to the locking disc 120 to an arrangement in which the support member 102 hangs beneath the mounting member 104. The support member 102 may of course be rotated to any required angular position for securement to by the wiring.

In use, during installation or once installed, any rotation or force supplied to the support member 102 by the wiring or otherwise causes the support member 102 to rotate relative to the locking disc 120. As the two components are relatively rotated the movement of the support member 102 does not impart any rotational forces to the locking disc 120. As such, in contrast to the rotationally fixed arrangements of the prior art, any rotational forces applied to the support member 102 do not result in rotation of the locking disc 120 and therefore do not cause rotational scoring of the plastic stud by the locking disc 120. Therefore, the cable support 100 is able to be held securely on the mounting stud with no degradation or loosening of the securement over time due to rotation of the metal locking disc 120 about the mounting stud. The locking disc 120 also provides the additional benefit that a series of locking discs 120 may be provided having varying inner diameters to allow the wiring support to be mounted to studs of varying sizes.

Figure 4:
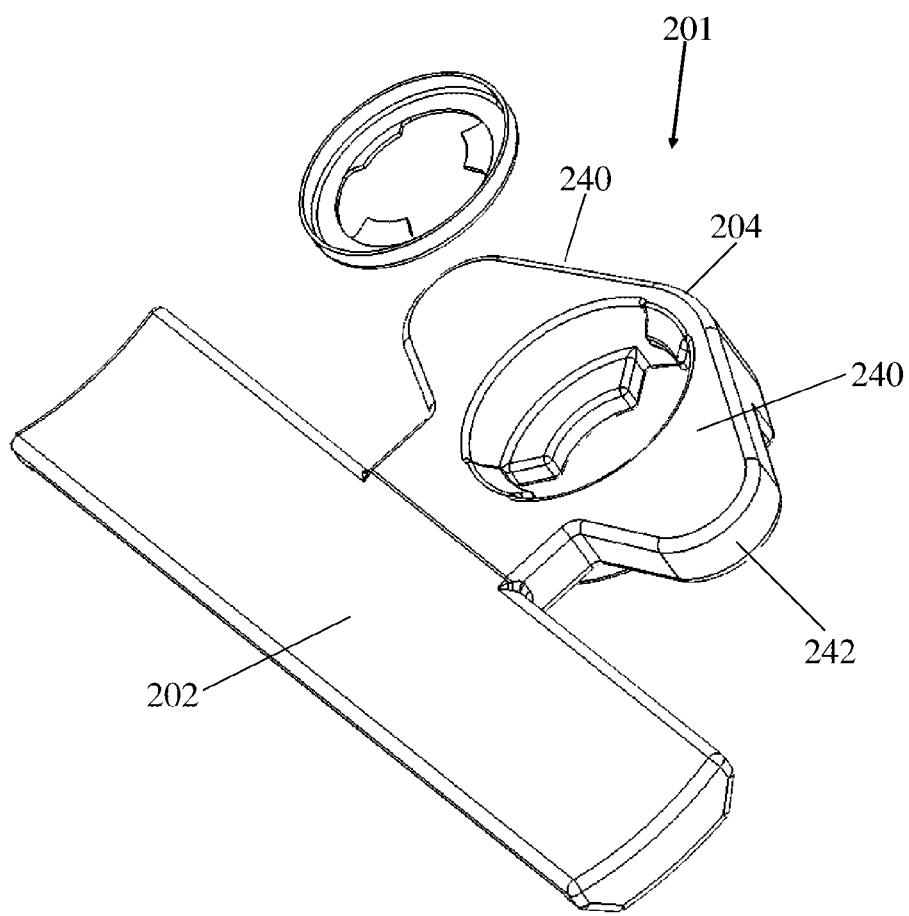
FIG. 4 shows a cable support according to a second embodiment of the invention.

A second embodiment of a cable support 201 is shown in FIG. 4 in which the cable support 201 includes a pair of wings or tabs 240 extending laterally from either side of the cylindrical body 216 of the clip section 204 in a radial direction. The tabs 240 taper inwardly towards a curved outer edge 242. The tabs 240 each include an outer engagement surface 244 facing away from the insertion direction. The engagement surface 244 of the tabs 240 increase the surface area available to which the user may apply pressure in the insertion direction to force the cable support 201 over the mounting stud 252. The increased surface area increases the distribution of force across the user's fingers thereby increasing comfort. In addition, the tabs 240 allow pressure to be applied at an increased radial distance, thereby mitigating the risk of the stub striking the user's fingers and causing injury as the cable support 201 is forced into the mounting stud 252.

Figure 5:
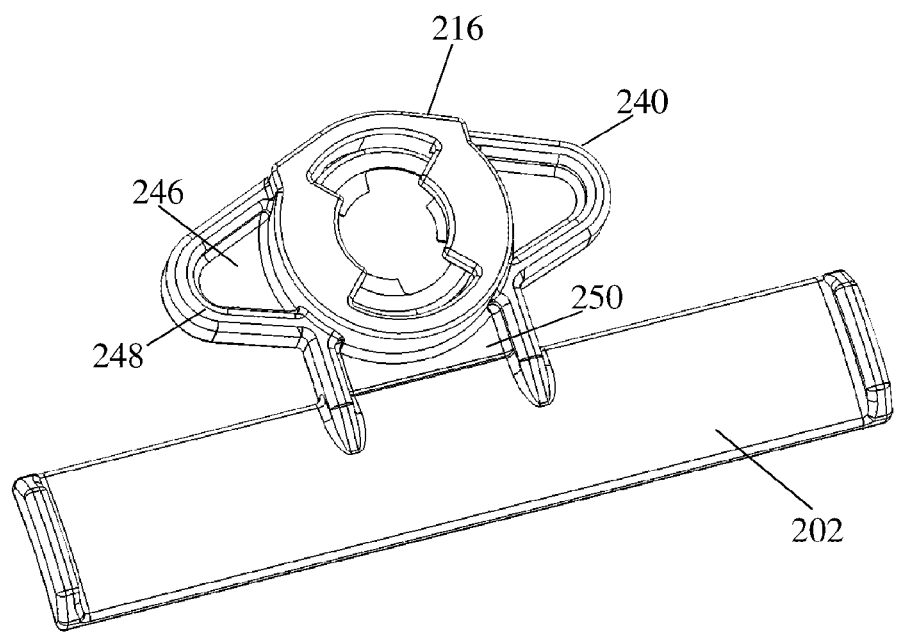
FIG. 5 shows a reverse view of the arrangement of FIG. 4.

As shown in FIG. 5, the reverse side of the tabs 240 include a recessed region 246 surrounded by a thicker peripheral section 248. Similarly a recessed region 250 is defined between the cylindrical body 216 and the blade 202. The recessed regions 246 and 250 reduce material and therefore cost of the cable support 201.

Figure 6:
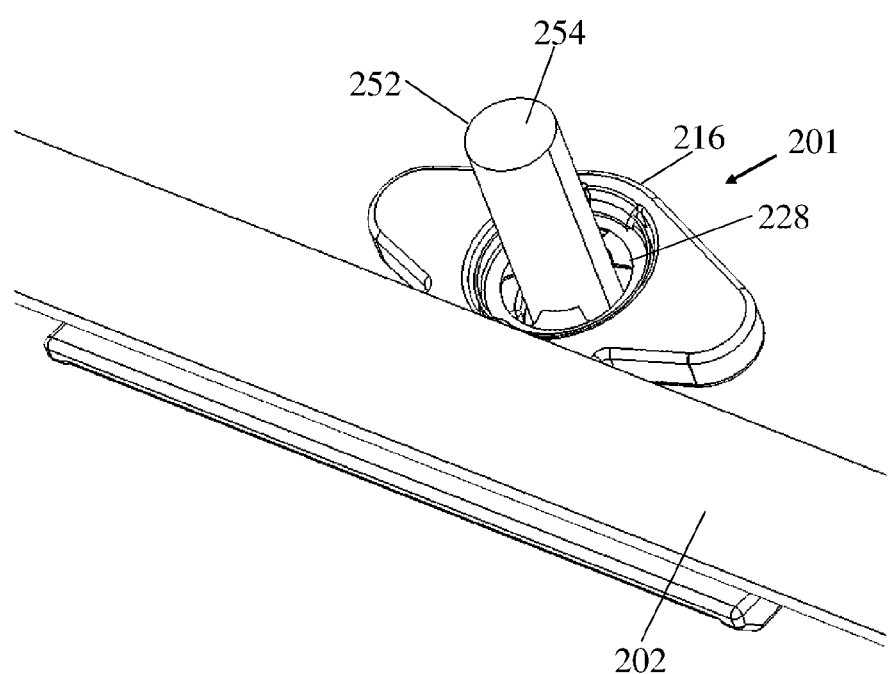
FIG. 6 shows the cable support of FIGS. 4 and 5 inserted on a support stud of a vehicle panel.

FIG. 6 shows the cable support 201 inserted on a stud 252. The mounting stud 252 is an elongate cylindrical member having a distal end 254. In the installed position the mounting stud 252 extends through the inner aperture defined by the inner edges 232 of the teeth 228 of the locking ring 220.

The teeth 228 are held in an interference fit with the mounting stud 252, which rotationally and axially fixes the locking ring 220 to the mounting stud 252. Meanwhile, the cylindrical body 216 and blade 202 are free to rotate relative to the locking ring 220 and the mounting stud 252. At the same time the locking ring 220 is axially fixed within the cylindrical body 216 and hence the cylindrical body 216 is axially fixed relative to the mounting stud 252 to prevent axial removal.

Figure 7:
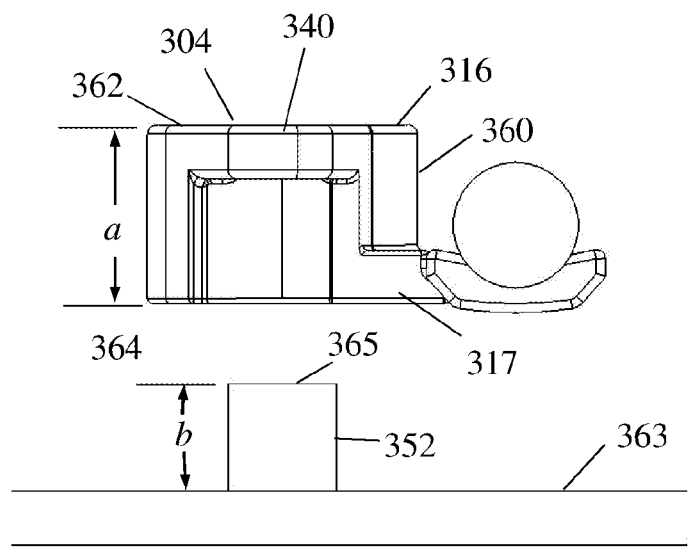
FIG. 7 is a side view of a cable support according a third embodiment of the invention.

A third embodiment of a cable support 301 is shown in FIG. 7. In this embodiment, the height of the main body 316 of the clip section 304 is extended to provide protection for the user's thumbs. As in the previous embodiments, the clip section 304 is pressed over the mounting stud 252 and the mounting stud 252 projects out through the upper end of the clip section. In use, the projecting stud 252 may contact the user's thumbs as the clip is pressed into place, causing inconvenience and potentially injuring the user. The main body 316 is therefore provided with a collar section 360 that extends upwardly above the height of the blade 302. The collar section 360 is cylindrical with the bore 318 extending therethrough. The upper surface 362 of the collar defines the upper edge of the main body 316, and the main body 316 also has a lower edge. The press tabs 340 project laterally from the upper surface 362 of the collar section 360 and are spaced vertically above the upper surface of the blade 302. The height of the main body 316 is the distance a between the upper surface 362 and lower surface 364. The main body 316 is connected to the blade 302 at its base 317 such that the lower surface 364 is substantially level with the lower surface of the blade 302.

Figure 8:
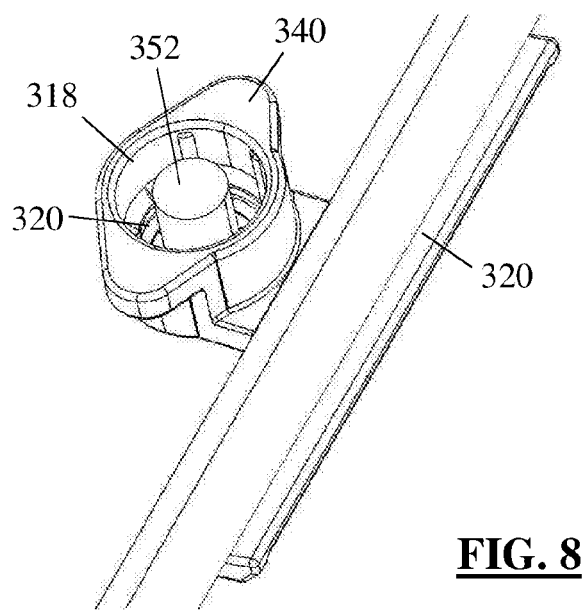
FIG. 8 is a perspective view of the arrangement of FIG. 7.
Figures 9, 10:
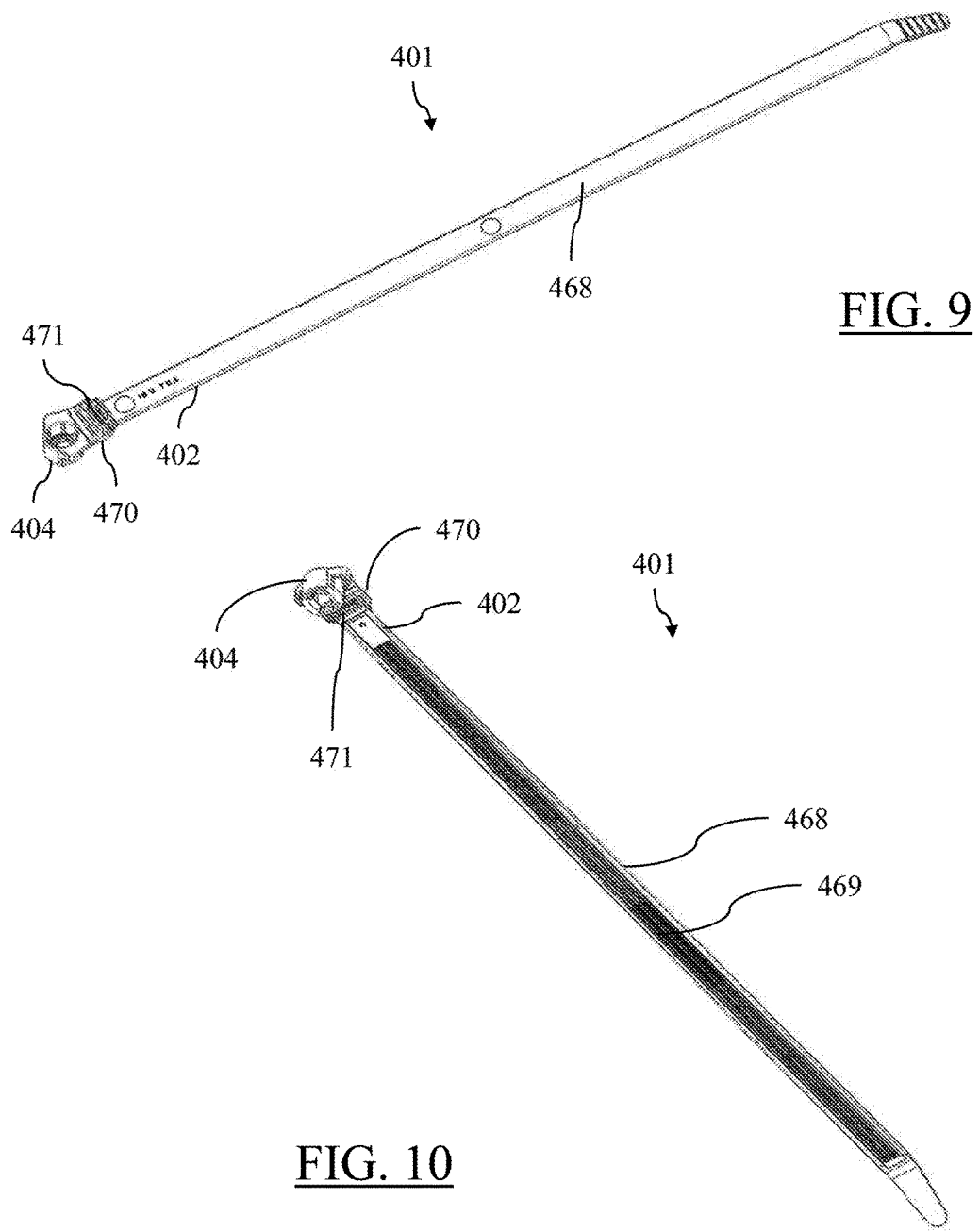
FIG. 9 is a perspective top view of a cable support according to a fourth embodiment of the invention.
FIG. 10 is a perspective bottom view of the arrangement of FIG. 9.
Figure 11:
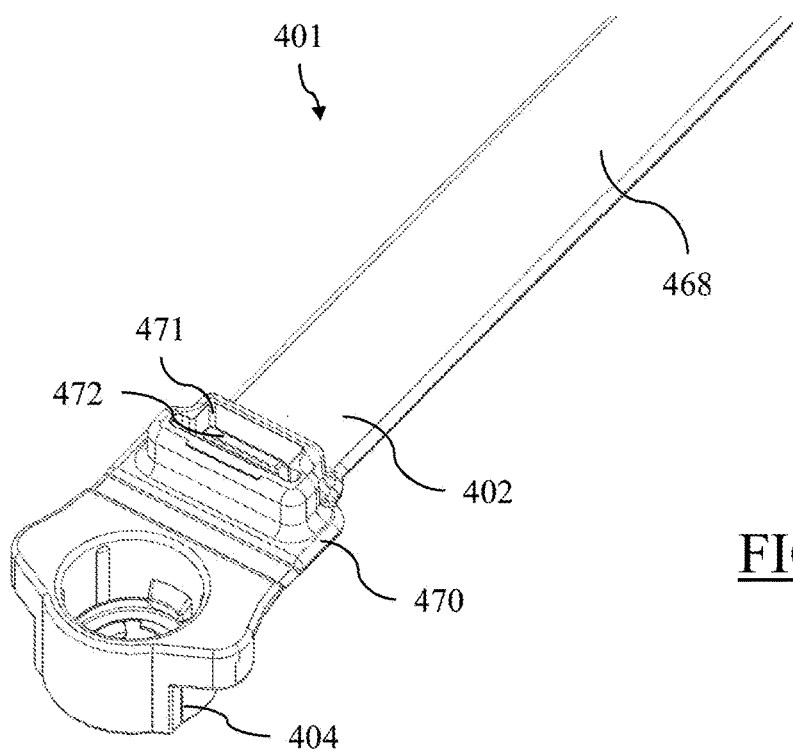
FIG. 11 is a close-up top view of a mounting section of the arrangement of FIG. 9.
Figure 12:
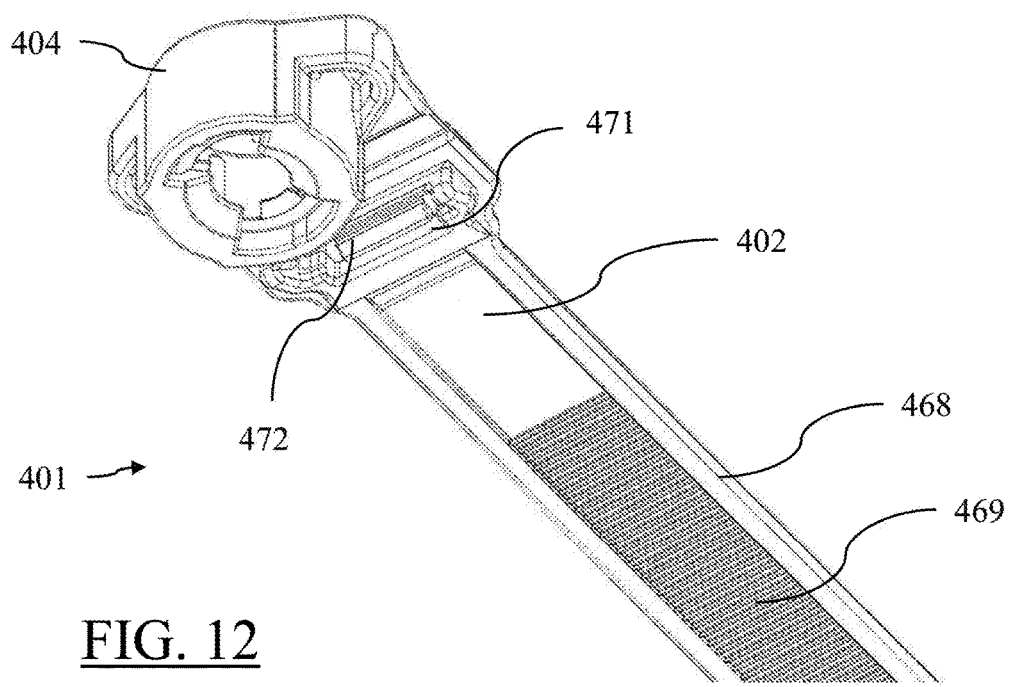
FIG. 12 is a close-up bottom view of the mounting section of the arrangement of FIG. 9.

The height a of the main body 316 is selected such that it is greater than the height b of the mounting stud 352 from the substrate 363 to its tip 365. Thereby, as can be seen in FIG. 8, when the clip section 304 is seated on the substrate 363 surrounding the base of the mounting stud 352, the mounting stud 352 remains within the main body 316 and does not project above the upper surface 362. Therefore, even if a user allows their thumb to extend over the bore 318 it will be shielded from contact with the mounting stud 352 during insertion by the extended height provided by the collar section 360.

In an alternative arrangement, the mounting stud 352 may be provided with a locating flange 366 located proximate its base. The locating flange 366 may be a disc having an enlarged diameter greater than the diameter of the bore 318. As such, when the clip section 304 is located over the mounting stud 352 the lower surface 364 seats on the locating flange 366 which acts as a stop member and vertically locates the clip section 304 on the mounting stud 352. The locking ring 320 is located within the bore 318 proximate the base of the bore 318 such that it locks to the mounting stud 352 close to the locating flange 366. The effective height of the mounting stud 352 is the height of the mounting stud 352 from the upper surface of the locating flange 366 to its tip.

A fourth embodiment of a cable support 401 is illustrated in FIGS. 9-12. The support member 402 includes a cable tie that is integrally formed with the mounting member 404 having an elongate strap 468 defining a plurality of toothed serrations 469 and a head 470 defining a strap aperture 471 in which the strap is received. A locking pawl 472 is located within the aperture 471 and is configured to engage the serrations 469 to secure the strap 468 within the aperture 471.

Figure 13:
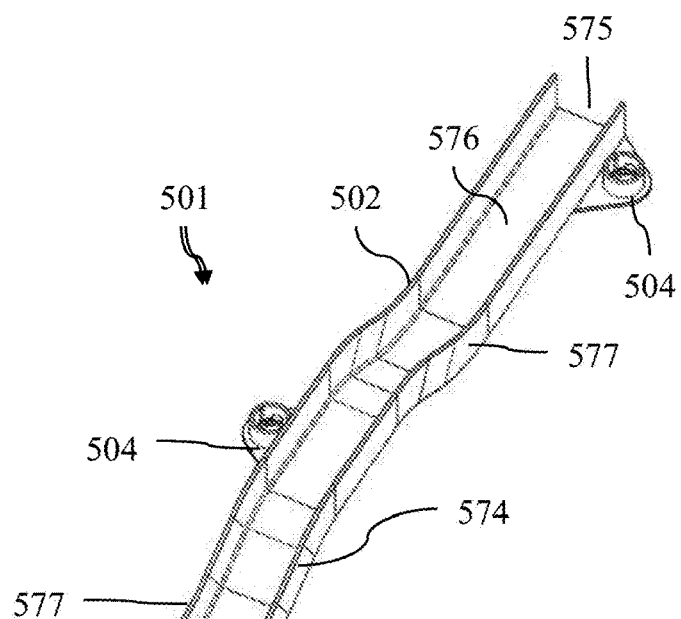
FIG. 13 is a perspective top view of a cable support according to a fifth embodiment of the invention.
Figure 14:
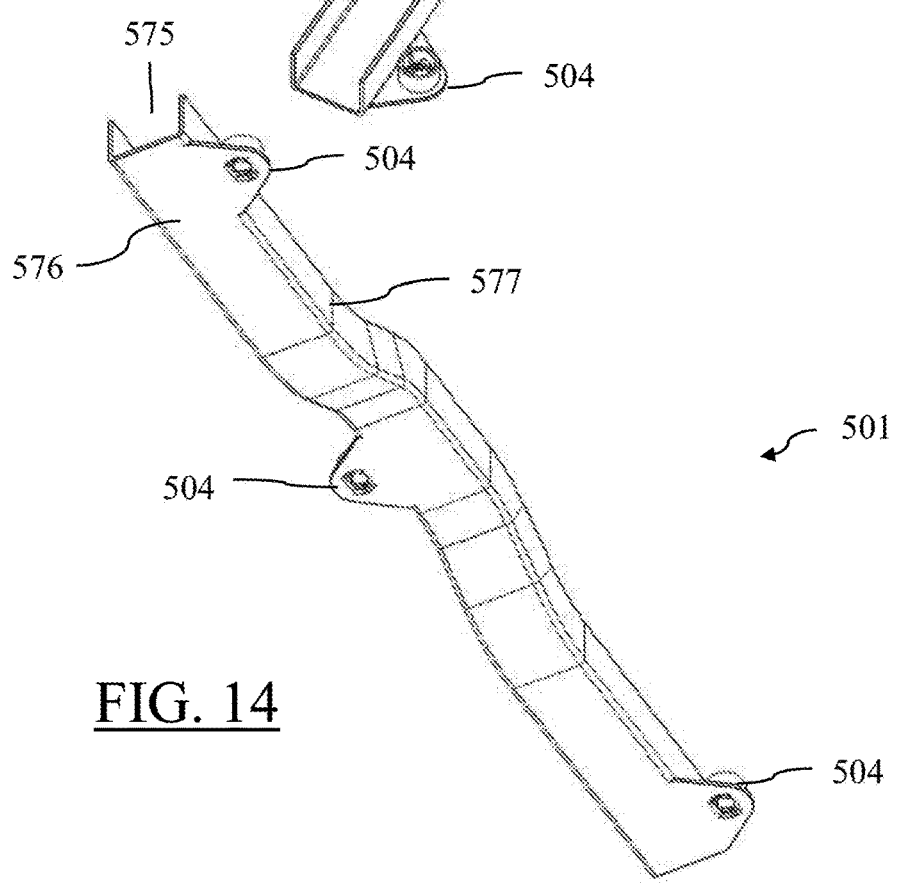
FIG. 14 is a perspective bottom view of the arrangement of FIG. 13.
Figure 15:
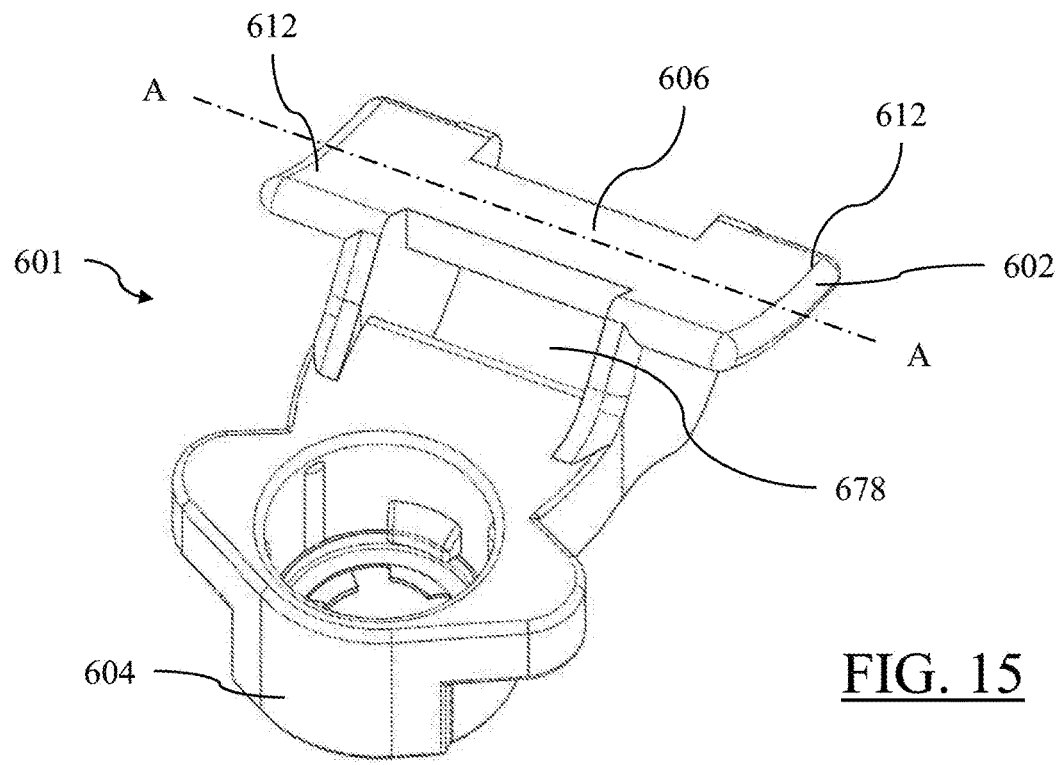
FIG. 15 is a perspective top view of a cable support according to a sixth embodiment of the invention.
Figure 16:
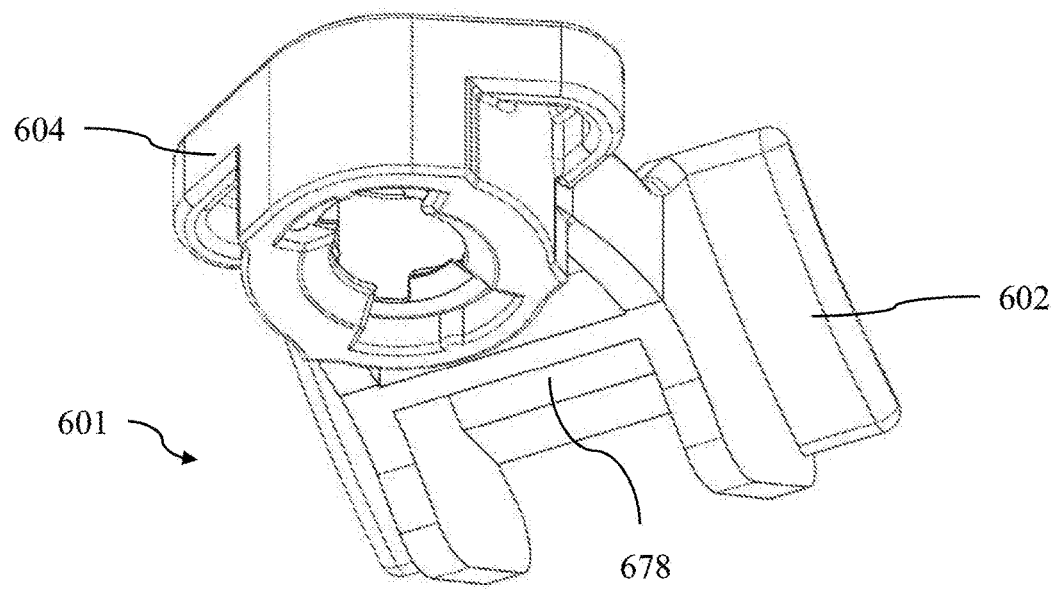
FIG. 16 is a perspective bottom view of the arrangement of FIG. 15.

A fifth embodiment of a cable support 501 is illustrated in FIGS. 13 and 14. The support member 502 includes a wire cable tray 574 that is integrally formed with multiple mounting members 504. The wire cable tray defines a channel 575 bounded by a floor 576 and two side walls 577 and is configured to receive and retain wire cables within.

Figure 17:
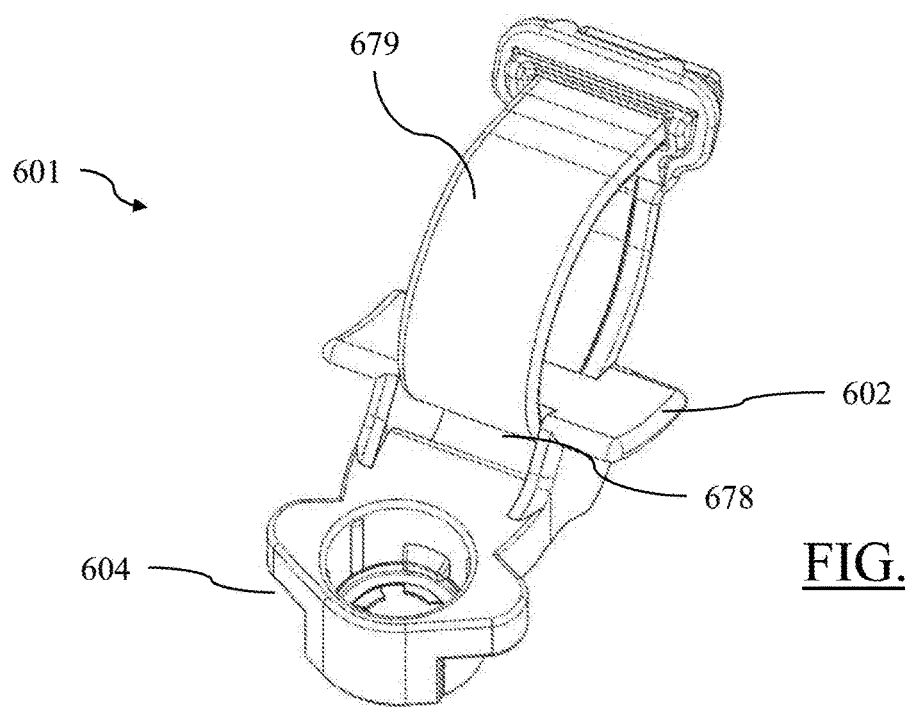
FIG. 17 is a perspective top view of the arrangement of FIG. 15 including a cable tie.
Figure 18:
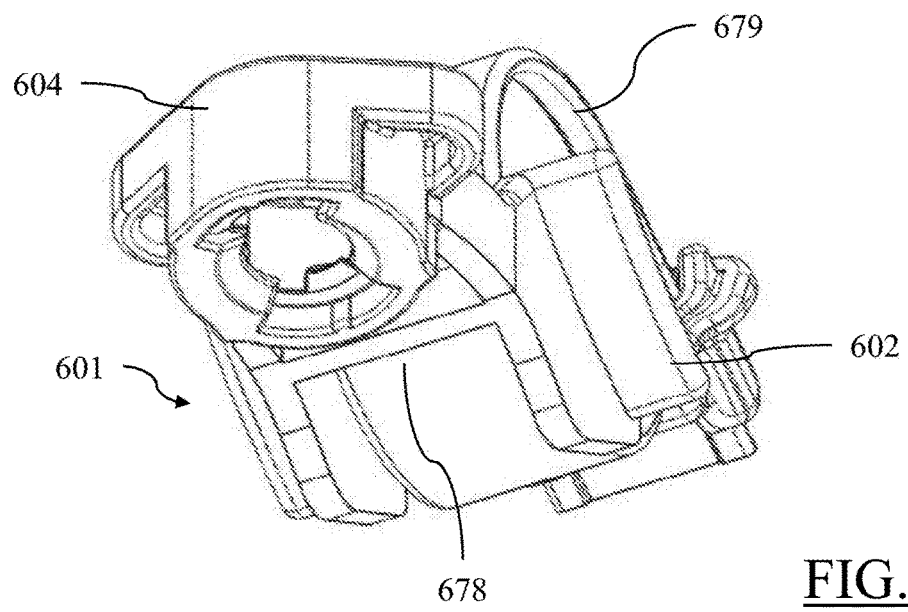
FIG. 18 is a perspective bottom view of the arrangement of FIG. 15 including a cable tie.

A sixth embodiment of a cable support 601 is illustrated in FIGS. 15-18. The support member 602 has an elongate rectangular form with a longitudinal axis A-A. The support member 602 includes a mounting surface 606 which, when in use, faces away from the trim panel and away from the insertion direction, and a corresponding inner surface 608. When in use, the wiring is secured to the mounting surface 606. The mounting surface 606 has a concave scalloped profile in the direction transverse to the longitudinal axis that is configured to accommodate the curved profile of a wiring bundle. The mounting member 604 extends from the lower edge 610 of the support member 602 and is centrally located along the length of the support member 602. End portions 612 of the support member 602 extend longitudinally outwards of the mounting member 604 in opposing directions. The support member defines a cable tie slot 678 beneath the mounting surface 606 and extending therethrough. As illustrated in FIGS. 17 and 18, a cable tie 679 may be inserted within the cable tie slot 678 to secure the wiring bundle to the cable support 601.

Figure 19:
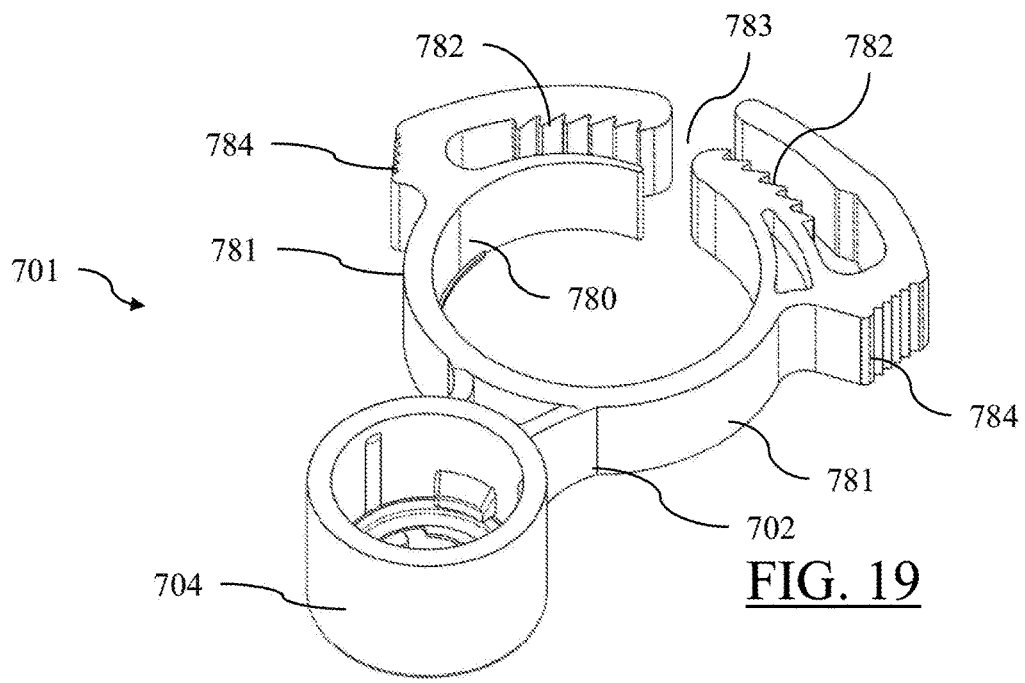
FIG. 19 is a perspective top view of a cable support according to a seventh embodiment of the invention.
Figure 20:
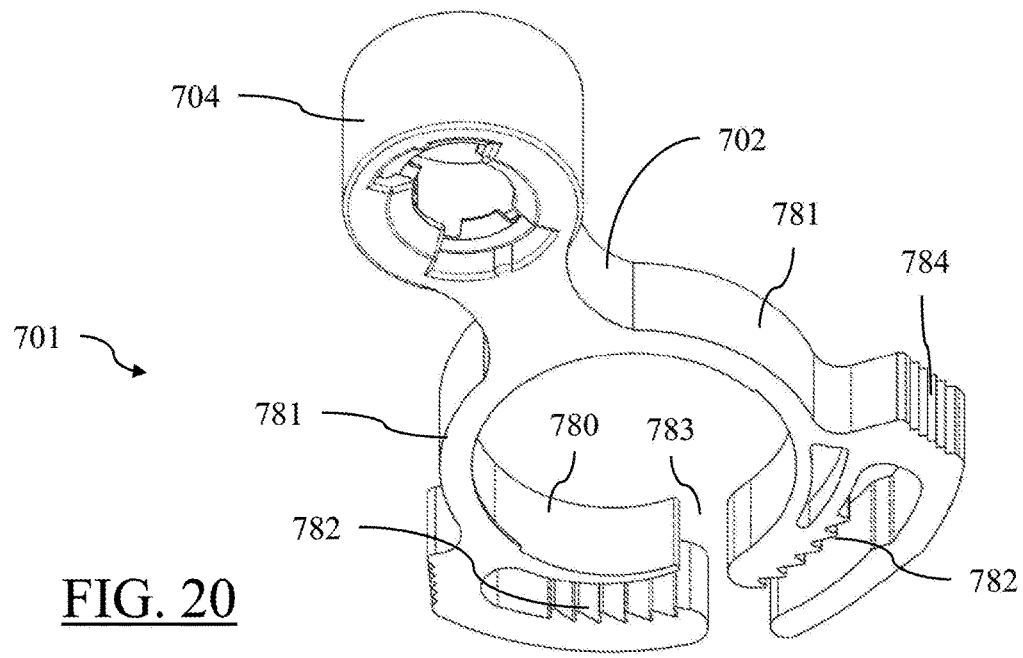
FIG. 20 is a perspective bottom view of the arrangement of FIG. 19.
Figure 23:
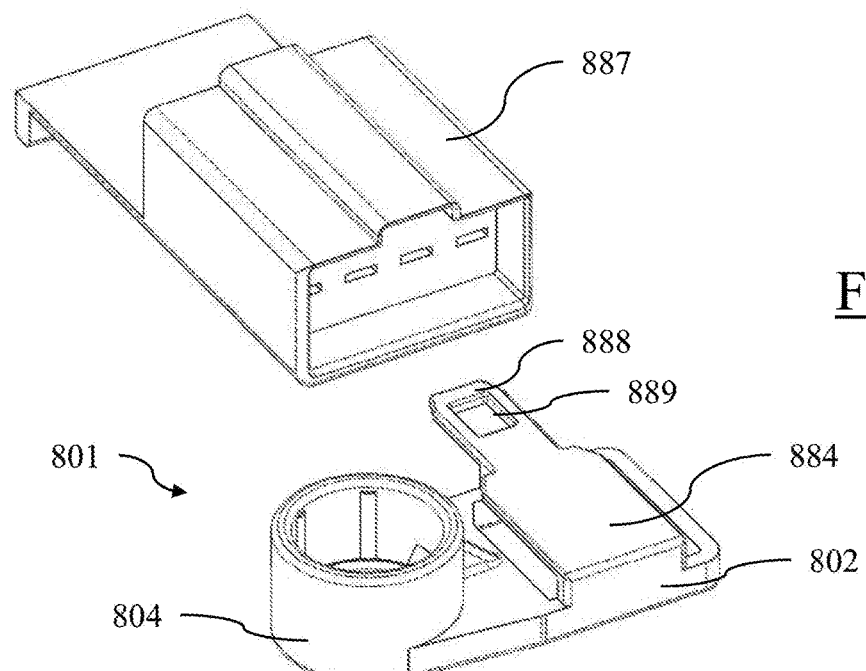
FIG. 23 is an exploded top view of the arrangement of FIG. 21 including a connector.
Figure 24:
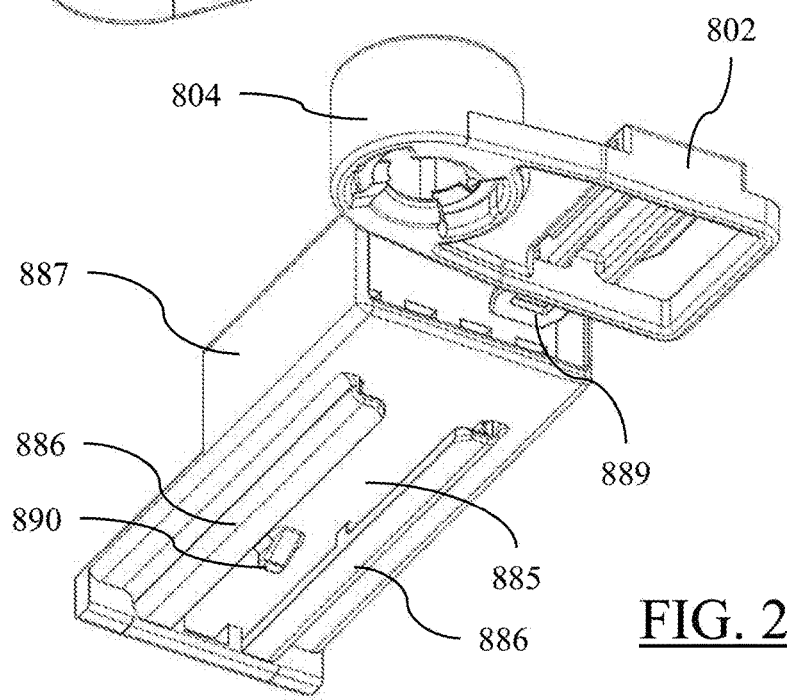
FIG. 24 is an exploded bottom view of the arrangement of FIG. 21 including the connector.

A seventh embodiment of a cable support 701 is illustrated in FIGS. 19 and 20. The support member 702 attached to the mounting member 704 includes a clamp 780 configured to secure a wiring bundle to the cable support 701. The clamp has two arcuate arms 781 each defining a plurality of opposed teeth 782. After the wiring bundle is placed within the clamp 780 though a gap 783 between the arms 781, the gap 783 is closed by pressing on the serrated pads 784 on each of the arms 781, thereby causing the teeth 782 to engage and secure the arms 781 to each other.

An eighth embodiment of a cable support 801 is illustrated in FIGS. 21-26. The support member 802 attached to the mounting member 804 includes a connector locking feature in the form of a tongue 884 that is configured to be received within a groove 885 bounded by a pair of rails 886 in an electrical connector body 887. An end 888 of the tongue has a rectangular aperture 889 that accepts a locking tang 890 within the groove, thereby securing the connector body 887 to the cable support 801 as shown in FIGS. 25 and 26.

Figure 27:
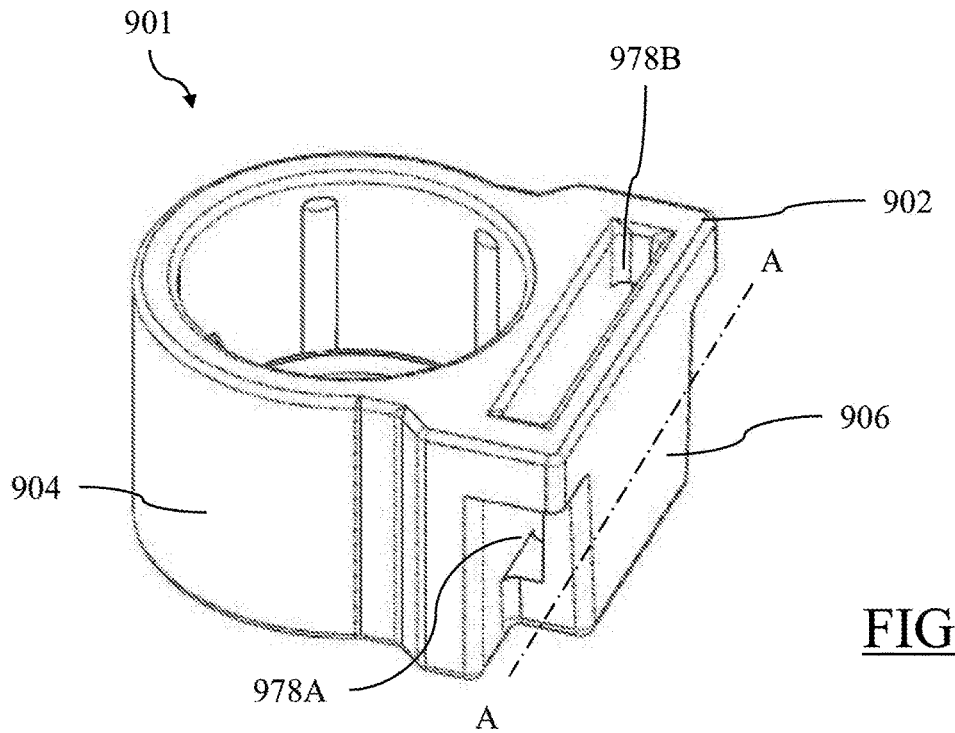
FIG. 27 is a perspective top view of a cable support according to an eighth embodiment of the invention.
Figure 28:
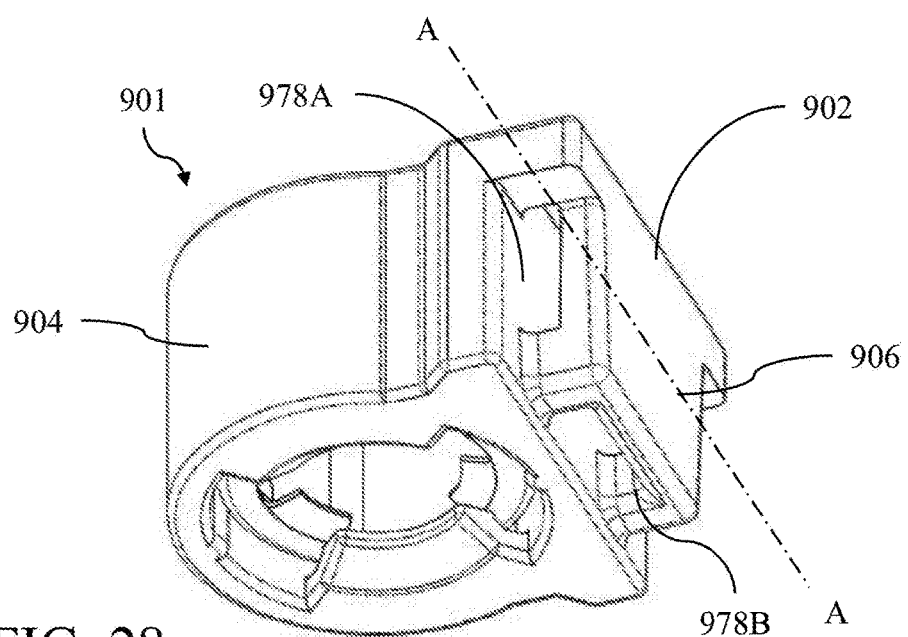
FIG. 28 is a perspective bottom view of the arrangement of FIG. 27.

A ninth embodiment of a cable support 901 is illustrated in FIGS. 27 and 28. The support member 902 has an rectangular form with a longitudinal axis A-A. The support member 902 includes a mounting surface 906 which, when in use, is generally perpendicular to the trim panel and the insertion direction. When in use, the wiring bundle is secured to the mounting surface 906. The mounting surface 906 has a planar profile. The mounting member 904 extends from the support member 902 and is centrally located along the length of the support member 902. The support member 902 defines two cable tie slots 978A and 978B beneath the mounting surface 906 and extending therethrough. Cable tie slot 978A extends along the longitudinal axis A-A and cable tie slot 978 B extends perpendicularly to the longitudinal axis A-A. A cable tie may be inserted within the cable tie slot 678 to secure the wiring bundle to the cable support 901.

Figure 29:
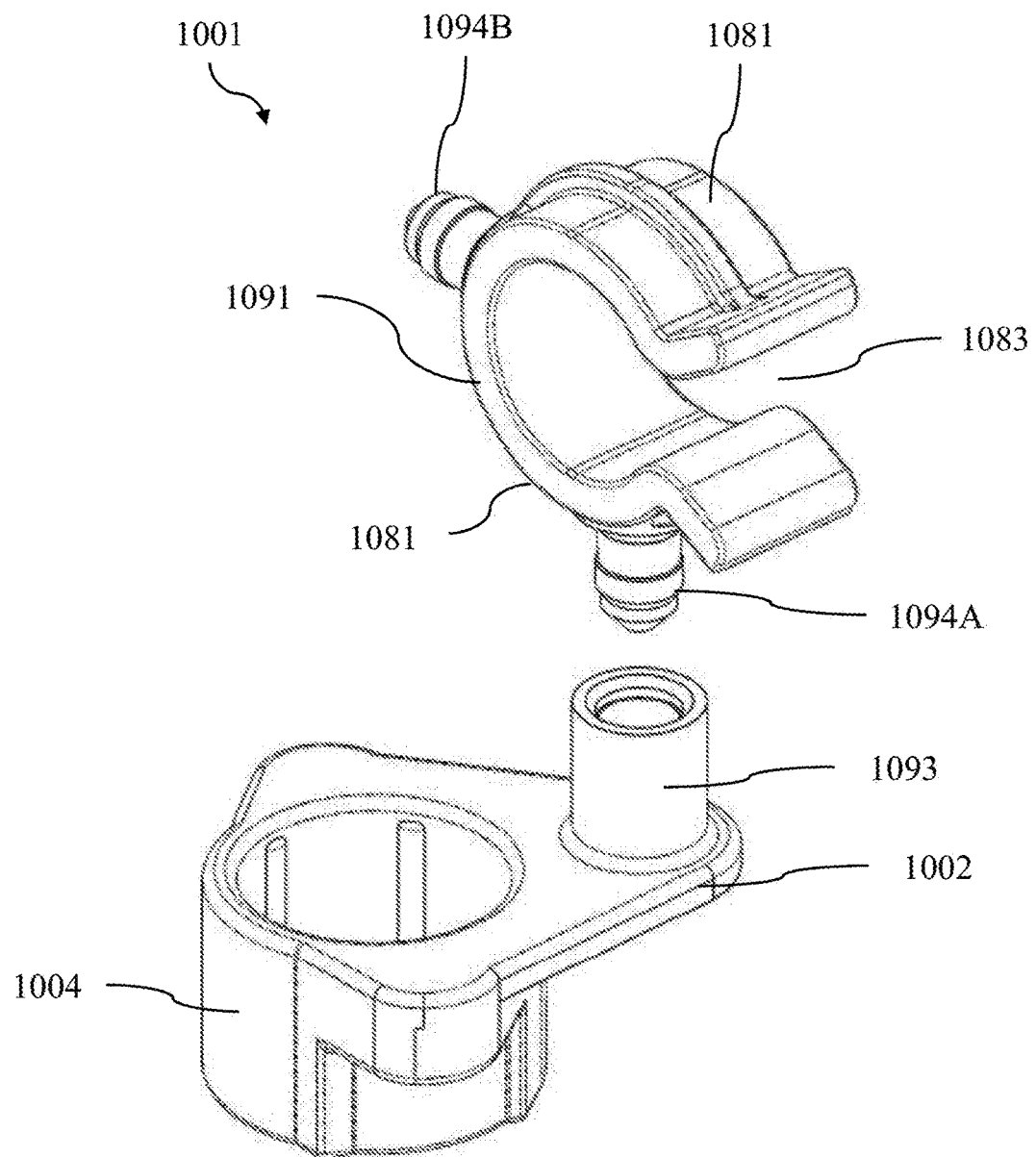
FIG. 29 is an exploded top view of a cable support according to a tenth embodiment of the invention.

A tenth embodiment of a cable support 1001 is illustrated in FIGS. 29-31. The support member 1002 has C-shaped clip 1091 that is rotatably attached to the support member 1002 by a cylindrical socket 1093 defined by the support member and a cylindrical post 1094 received within the socket. The clip has two arcuate arms 1081 separated by a gap 1083 through which the wiring bundle is inserted into the clip 1091. The clip 1091 defines two posts, one post 1094A extending outwardly between the two arms opposite the gap and another post 1094B extending from one of the arms 1081. These posts 1094 provide the benefit of having two possible orientations of the clip 1091 relative to the cable support 1001.

Figure 32:
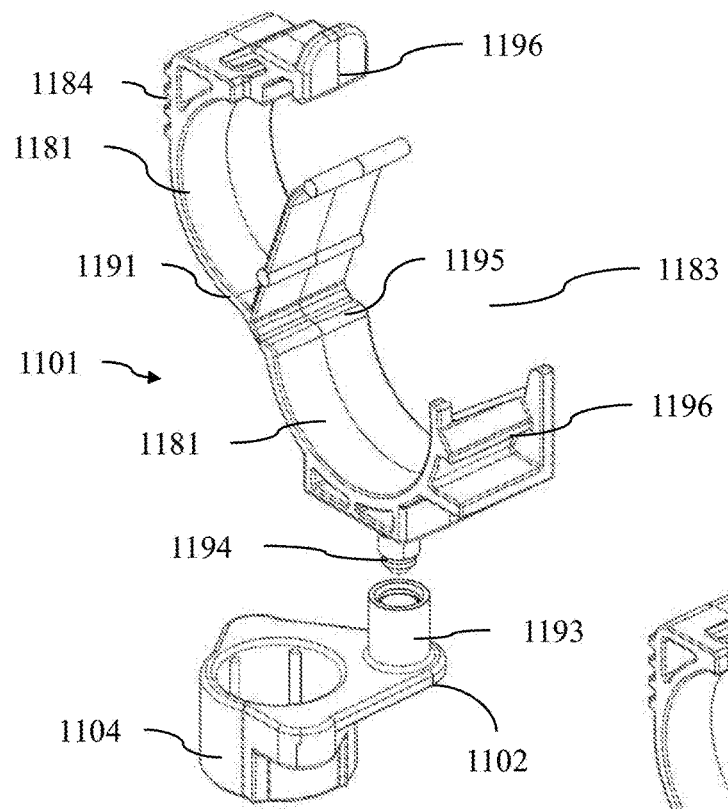
FIG. 32 is an exploded top view of a cable support according to an eleventh embodiment of the invention.
Figure 33:
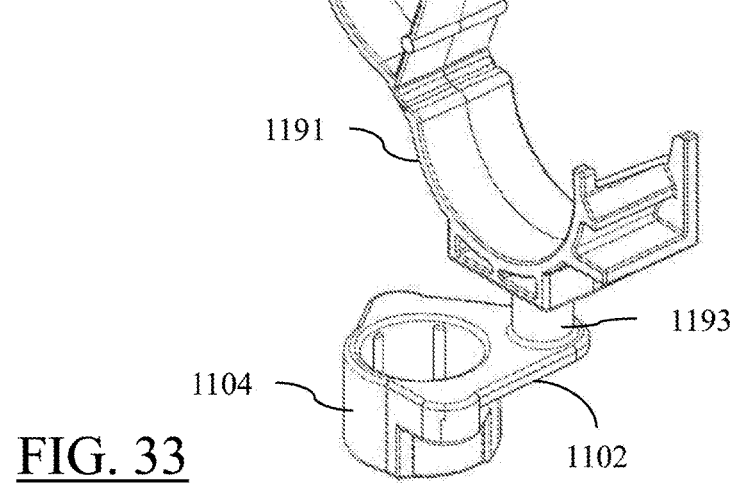
FIG. 33 is a perspective top assembled view of the arrangement of FIG. 32.

An eleventh embodiment of a cable support 1101 is illustrated in FIGS. 32 and 33. The support member 1102 has clamp 1180 that is rotatably attached to the support member 1102 by a cylindrical socket 1193 defined by the support member and a cylindrical post 1194 received within the socket. The clip has two arcuate arms 1181 separated by a gap 1183 through which the wiring bundle is inserted into the clip 1180. The arms 1181 are joined by a living hinge 1195 and include a latching feature 1196 on each end. After the wiring bundle is placed within the clamp 1180 though a gap 1183 between the arms 1181, the gap 1183 is closed by pressing on a serrated pads 1184 on one of the arms 1181, thereby causing the latching features 1196 to engage and secure the arms 1181 to each other.

It will be appreciated that while the above description of the specific embodiment refers to use of the cable support in supporting electrical cables, the term cable may incorporate any cables such as data cables, mechanical cables etc. or any other elongate flexible members, such as hydraulic lines, pneumatic lines, or plant vines. In addition, the use of the cable support is not limited to use in a vehicle interior and may be utilized in any situation where securement of cables to a surface having a suitable stud is required.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

In the following claims, the terms "including" and "in which" are used as the plain-English equivalents of the respective terms "comprising" and "wherein." Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

Further, the limitations of the following claims are not written in means-plus-function format and are not intended to be interpreted based on 35 USC § 112(f), unless and until such claim limitations expressly use the phrase "means for" followed by a statement of function void of further structure.

I claim:

1. A cable support comprising:
    a support member for supporting a cable or cables secured thereto;
    a mounting section configured to secure the cable support to a panel, wherein the mounting section comprises a bore configured to receive a mounting stud; and
    a locking member having an aperture formed therein for receiving said mounting stud, the locking member being connected to the mounting section in axial alignment with the bore, wherein the locking member is rotatably connected to the mounting section such that the mounting section and the support member are rotatable relative to the locking member, wherein the bore of the support member includes an innermost opening and an outermost opening with an insertion direction being defined in a direction extending from the outermost opening towards the innermost opening which in use is the direction in which the mounting section is inserted onto the mounting stud and wherein the locking member is inserted into the mounting section in the insertion direction with the mounting section including one or more stop members to limit axial insertion of the locking member and one or more retaining members to prevent removal of the locking member in the opposite axial direction once inserted.

2. The cable support according to claim 1, wherein the support member is an elongate blade.

3. The cable support according to claim 1, wherein the locking member is axially fixed relative to the mounting section.

4. The cable support according to claim 2, wherein the cable support has a support surface to which the cable or cables are secured, and the support surface has a concave profile in a direction transverse to a length of the elongate blade.

5. The cable support according to claim 1, wherein the locking member is annular.

6. The cable support according to claim 5, wherein the locking member comprises a plurality of radially extending elongate slots extending radially outwards from an inner edge defining a plurality of annularly arranged teeth.

7. The cable support according to claim 6, wherein at least a radially innermost portion of the plurality of teeth are angled in an axial direction with the locking member being mounted to the mounting section such that the plurality of teeth are angled in an opposite axial direction to the insertion direction to inhibit axial removal of the locking member from the mounting stud.

8. The cable support according to claim 7, wherein the locking member is formed of metal.

9. The cable support according to claim 8, wherein the locking member is mounted within the bore of the mounting section.

10. The cable support according to claim 1, wherein the one or more retaining members is a retaining clip arranged to flex in the axial direction from a retaining position to an insertion position, the retaining clip being arranged to flex to the insertion position on insertion of the locking member, and to return to the retaining position following insertion of the locking member.

11. The cable support according to claim 1, wherein an axial spacing between the one or more stop members and retaining members is substantially equal to a thickness of the locking member to limit axial movement of the locking member within the bore.

12. The cable support according to claim 1, wherein the one or more stop members includes a curved inner surface having a radius corresponding to an inner radius of the locking member such that an inner edge of the locking member at the one or more stop members are radially aligned.

13. A cable support configured to support a cable secured to a mounting stud, said cable support comprising:
    a support member configured to support the cable secured thereto; and
    a mounting member connected to the support member and configured to secure the support member to the mounting stud, wherein the mounting member defines a circular bore configured to receive the mounting stud, wherein a locking member is disposed within the bore, the locking member defining an aperture therein configured to receive the mounting stud, wherein the locking member is connected to the mounting member such that the locking member is rotatable relative to the mounting member, wherein the locking member is in axial alignment with the bore, wherein the locking member is a metal disk having an annular planar surface surrounding the aperture, wherein the locking member further includes a reinforcing wall surrounding an outer edge of the annular planar surface, wherein the mounting member includes a stop member extending in a circumferential direction from a bore edge and a retaining clip extending in the circumferential direction from the bore edge axially separated from the stop member, and wherein the reinforcing wall is disposed intermediate the stop member and the retaining clip.

14. The cable support according to claim 13, wherein the locking member comprises a plurality of elongate slots extending radially outwards from an inner edge of the annular planar surface, thereby defining a plurality of annularly arranged teeth, said plurality of teeth configured to engage the mounting stud.

15. The cable support according to claim 14, wherein the mounting member includes two stop members diametrically opposed to one another and each extending in the circumferential direction around approximately one quarter of the bore edge.

16. The cable support according to claim 15, wherein the mounting member includes two retaining clips diametrically opposed to one another and wherein the two retaining clips include a tapered leading edge which is engaged by the locking member as the locking member is inserted into the bore.

17. The cable support according to claim 16, wherein the two retaining clips are flexible and configured to axially flex as the locking member is inserted within the bore.

18. The cable support according to claim 16, wherein radially curved inner edges of the two stop members have a radius substantially equal to a radius of an inner edge of the plurality of teeth.

19. The cable support according to claim 16, wherein an axial spacing between an axially outer facing surface of the stop member and an axially inner facing surface of the two retaining clips is such that the axial spacing is substantially equal to a height of the reinforcing wall.

20. The cable support according to claim 19, wherein a radial spacing between the axially outer facing surface of the stop member and the axially inner facing surface of the two retaining clips is such that the locking member is able to rotate within the bore.

21. The cable support according to claim 13, wherein the support member is an elongate blade.

22. The cable support according to claim 21, wherein the cable support has a support surface to which the cable is secured and wherein the support surface has a concave profile in a direction transverse to a length of the elongate blade.

23. The cable support according to claim 13, wherein the mounting member includes a pair of tabs extending laterally from both sides of the mounting member in a radial direction.

24. The cable support according to claim 13, wherein the mounting member includes a flange extending radially from a base of the mounting member.

25. The cable support according to claim 13, wherein the support member further comprises an elongate strap defining a plurality of serrations and a tie head defining a strap aperture configured to receive the elongate strap.

26. The cable support according to claim 13, wherein the support member defines a channel configured to longitudinally receive the cable.

27. The cable support according to claim 26, wherein the cable support comprises a plurality of mounting members.

28. The cable support according to claim 13, wherein the support member defines a first cable tie slot beneath a mounting surface, said first cable tie slot extending therethrough and configured to receive a cable tie.

29. The cable support according to claim 28, wherein the support member defines a second cable tie slot beneath the mounting surface and wherein the first cable tie slot is generally perpendicular to the second cable tie slot.

30. The cable support according to claim 13, wherein the support member further comprises a clamp configured to engage and retain the cable to the cable support.

31. The cable support according to claim 30, wherein the clamp is rotatably attached to the cable support.

32. The cable support according to claim 13, wherein the support member further comprises a flexible clip configured to engage and retain the cable to the cable support.

33. The cable support according to claim 32, wherein the clip is rotatably attached to the cable support.

34. The cable support according to claim 13, wherein the support member further comprises a connector locking feature configured to retain a connector body to the cable support.

* * * * *